United States Patent Office 2,825,687
Patented Mar. 4, 1958

2,825,687

TRANSPARENT CONDUCTING FILMS

John Silvey Preston and Eric John Gillham, Teddington, England, assignors to National Research Development Corporation, London, England, a corporation of Great Britain No Drawing. Application April 1, 1953
Serial No. 346,285

(Filed under Rule 47(a) and 35 U. S. C. 116)

Claims priority, application Great Britain April 4, 1952

5 Claims. (Cl. 204—192)

This invention relates to the production of transparent electrically conductive coatings on transparent supports such as the vitreous materials which can conveniently be referred to as glass and transparent plastics. An object of the invention is to obtain simultaneously both high conductivity and high optical transmission.

High conductivity and high optical transmission are incompatible in so far as other things being equal the former calls for thickness and the latter for thinness of the coating. In general the highest conductivity is possessed by metals, which if sufficiently thin are also transparent, but practical tests show that a film of metal on glass or plastic applied by cathode sputtering or by evaporation (i. e. condensation of vapour) has a very much lower conductivity and lower optical transmission than is to be expected from the "bulk" values of conductivity and optical constants. Moreover, both these properties are often found to be still further impaired by heating, even to moderate temperatures such as 100 to 150° C.

Further films directly applied by cathode sputtering or by evaporation adhere very weakly to such materials as glass or plastic and are of little practical value from this point of view as well.

Claims have been made for transparent articles such as windows, comprising a body of glass or the like, an intermediate transparent adhesive layer directly adhered by molecular forces to the glass and a continuous film of metal substantially free from light scattering and permanently adhered to the intermediate layer, the metal film having an electrical resistivity of not more than 150 (preferably not more than 25) ohms per square and the light transmission of the article being at least 50 percent (preferably at least 70 percent). The intermediate layer was to be a metal oxide, a metal sulphide, a metal halide or an oxidised metallic compound of the sulphur family. Specifically, oxides of lead, silver, aluminium, magnesium, nickel, zinc, thorium and rare earth metals, cadmium, antimony, bismuth, mercury, copper, gold, platinum and palladium were proposed and also sulphides, sulphates, selenides, selenates, tellurides, tellurates and fluorides. Specific metals proposed for the metallic film were copper, iron, silver, gold and nickel, but other unspecified metals were included. Further claims were made for applying an adherent protecting film of a hard metallic oxide over the metallic film, or in the case of a metal film of gold, for the application of a protective film of magnesium fluoride over the gold film.

Our present invention is based on our discovery that for a metallic film of gold, satisfactory results can only be obtained with a limited range of materials for the intermediate layer between a support such as glass or plastics and that a further improvement can be obtained by a subsequent heat treatment. We have also found that the metallic film should be applied by cathode sputtering under appropriate conditions.

It is characteristic of the materials which we use for the intermediate layer that they are oxides of materials which are comparatively easily reduced under the conditions obtaining if the film of gold is applied by cathode sputtering. This group consists of the oxides of cadmium, lead, tellurium, antimony and bismuth (bismuth being in the same group as antimony in the periodic classification).

It will be understood that under the conditions of application of the metallic film the oxide layer is not wholly or even substantially reduced. There is probably only a reduction of the surface molecules but the effect is to facilitate the formation of a continuous film of metal. Such reduction would be less likely to occur under the milder conditions of vacuum evaporation. Since it is our purpose to facilitate reduction of the surface of the oxide layer, we effect the cathode sputtering of the metallic layer in an inert atmosphere such as argon which is free of oxygen.

We have discovered that though low resistivity can be obtained merely by proceeding as above outlined, a substantial enhancement can be effected by a subsequent heat treatment which must be carried out, however, at a temperature which does not cause damage either to the metal film or the support. This heat treatment may be carried out in air.

Desirably, we apply another transparent layer over the metallic film. This not only protects the metallic film but stabilises it against heating and enables the heat treatment to be carried to a higher temperature, if the outermost layer is suitably chosen, e. g. desirably of the same material as the intermediate layer, which is selected from members of the group consisting of oxides of cadmium, lead, tellurium, antimony, and bismuth. Just as the intermediate layer helps to produce a continuous film of metal by the surface forces which act between it and the under-surface of the metallic film, so the outer layer also helps by the surface forces acting between it and the outer surfaces of the metal film. Whereas without the outermost layer, heat treatment above about 250° C. damages the film, with the layer the treatment can be carried to about 350° C. without damaging the film, thus further improving the conductivity of the film. By prolonging the period of heating a lower temperature can be used but below 250° C. the necessary time to obtain the full improvement in conductivity which this invention makes possible becomes unduly long. It will be understood that one heat treatment may be carried out after the deposition of the metal film and another after the deposition of the outermost layer. It will thus be appreciated that the heating may be carried out in two separate stages or steps, one heating step occuring after application of the gold film and the other heating step after the deposition of the outermost, protective layer. Most transparent plastics are damaged at temperatures above about 150° C. and accordingly the best results according to the invention are only attainable when the transparent support is of glass.

If the material of the intermediate layer is not deemed hard enough for use as the outer layer, the outer layer can then be of some material which is harder, e. g. antimony oxide or tin oxide, provided it does not favour a disruptive action on the metal film.

So far the invention has been described with more particular reference to the electrical properties of the metallic film, that is to say, with a view to producing low resistivity. An object of the invention is, however, to produce high transparency without increasing the resistivity. From this point of view an important factor is the thickness of the intermediate layer and the outer layer. It can be shown that if, as is the case with the oxides used in this invention, their refractive index is greater than that of the transparent support, the best results from this point of view are obtained if both layers are quarter-wave layers, that is to say, if their optical thickness, which is the real thickness multiplied by the refractive index, is equal to one-quarter of the wave-length of the preferred colour of light to be transmitted, or rather slightly less than the quarter-wave, because of the interaction of the metal film with the standing wave system though this interaction is small with a very thin metal film as here under consideration. To put the matter in other words, if the total thickness of the three layers is anything near a half wave-length, the metal film should be mid-way between the surfaces. In many cases it is possible to work with thinner intermediate and outer layers and in that case the total transparency is somewhat less and is less affected by displacement of the metallic film from the mid-position. By way of example, where a transmission of 84 percent is obtained with two quarter-wave layers, one on each side of a gold layer, if the layers are thinner, being merely sufficient to ensure that the desired enhancement of conductivity of the metallic film is obtained, then the transmission may fall to 76 percent, the resistance in either case being the same. In the other direction, undue thickness of the film should be avoided, since this tends to increase the optical absorption if the two oxide films are not of a sufficiently transparent material and it can also lead to undesirable colouration, due to effects of optical interference.

A further practical advantage of the coatings produced by the invention is that they transmit or absorb only a small proportion of infra-red radiation incident on them and reflect the greater part of this radiation.

In the case of the five metals, the oxides of which are used according to the invention to produce the intermediate layer, the layer may conveniently be applied by cathode sputtering of the metal itself in argon containing a trace of oxygen. The metal film may then be sputtered in argon free from oxygen. The thickness of the metal film will depend on the desired conductivity, which will be of the same order as the bulk conductivity of the metal itself. By the same order we mean having a value of say, one third or possibly better.

By way of specific example, with an intermediate layer of bismuth oxide 400 Å. thick, a film of gold of thickness of 140 Å. and an outer layer of bismuth oxide 400 Å. thick, we have obtained an optical transmission of about 82 percent and a resistance between 7 and 8 ohms per square. By subjecting such a triple layer to heat treatment of 350° for three minutes the optical transmission is slightly improved to 84 percent and the resistance is reduced to 3.5 ohms per square.

The examples tabulated below will illustrate in detail the results which are obtainable by the invention, including the effect of varying the thicknesses of the gold and oxide layers. The thicknesses are all in Angstrom units and where two thicknesses of the oxide layers are given, the greater thickness is that of a quarter-wave layer. In all cases the support was of glass and all three layers were deposited by cathode sputtering, the two oxide layers in argon with a trace of oxygen, the gold film free from oxygen, while the heat treatment was at 350° C. for a few minutes in air, except in the case of tellurium oxide, when the temperature was 300° C.

| Material and Thickness of Intermediate layer | Thickness of Gold film | Material and thickness of outermost layer | Resistance per square | Optical Transmission |
|---|---|---|---|---|
| Bismuth Oxide, A. | A. | Bismuth Oxide, A. | Ohms | Percent |
| 400 | 85 | 400 | 5.6 | 82 |
| 400 | 110 | 400 | 4 | 80 |
| 400 | 140 | 400 | 3.5 | 84 |
| 400 | 280 | 400 | 1.4 | 71 |
| 100 | 75 | 100 | 6.5 | 78 |
| Antimony Oxide | | Antimony Oxide | | |
| 500 | 80 | 500 | 20 | 78 |
| 500 | 110 | 500 | 11 | 79 |
| 500 | 140 | 500 | 7 | 76 |
| 150 | 80 | 150 | 22 | 71 |
| Lead Oxide | | Lead Oxide | | |
| 400 | 80 | 400 | 10 | 77 |
| 400 | 110 | 800 | 6.2 | 74 |
| 100 | 80 | 100 | 8 | 70 |
| Cadmium Oxide | | Cadmium Oxide | | |
| 500 | 80 | 500 | 13 | 73 |
| 500 | 100 | 500 | 10.5 | 75 |
| 100 | 80 | 100 | 12.5 | 74 |
| Tellurium Oxide | | Tellurium Oxide | | |
| 600 | 80 | 600 | 15 | 80 |
| 600 | 100 | 600 | 8.5 | 78 |

We claim:
1. A method of producing a transparent, electrically conductive coating on a transparent glass support which comprises applying directly onto one surface of a transparent glass support, in a substantially inert atmosphere, an intermediate layer, consisting of a thin transparent layer of an oxide of a material selected from the group consisting of cadmium, lead, tellurium, antimony and bismuth, applying directly onto said intermediate layer, by cathode sputtering, in an inert atmosphere free from oxygen, a film of gold thin enough to be transparent, and then, heating the coated glass support to a temperature above about 150° C. and below about 250° C. for a time sufficient to enhance the electrical conductivity of the film of gold.

2. A method according to claim 1 which further comprises applying directly onto the film of gold, a thin transparent protective layer, consisting of the same oxide as used for said intermediate layer.

3. A method according to claim 2 which further comprises heating the coated glass support after application of said protective layer to a temperature below about 350° C. for a time sufficient to enhance the electrical conductivity of the film of gold.

4. A method of producing a transparent, electrically conductive coating on a transparent glass support which comprises applying directly onto one surface of a transparent glass support, in a substantially inert atmosphere, an intermediate layer, consisting of a thin transparent layer of an oxide of a material selected from the group consisting of cadmium, lead, tellurium, antimony and bismuth, applying directly onto said intermediate layer, by cathode sputtering, in an inert atmosphere free from oxygen, a film of gold, applying a thin transparent protective layer of a material selected from the class consisting of cadmium oxide, lead oxide, tellurium oxide, antimony oxide, bismuth oxide, tin oxide and magnesium fluoride, which protects the film of gold without substantially reducing conductivity or transparency, and then, heating the coated glass support to a temperature above about 150° C. and below about 350° C. for a time sufficient to enhance the electrical conductivity of the film of gold.

5. A method as set forth in claim 4 wherein said thin transparent protective layer applied over the film of gold consists of the same oxide as used for said intermediate layer.

References Cited in the file of this patent

UNITED STATES PATENTS

| | | |
|---|---|---|
| 2,252,770 | Janes | Aug. 19, 1941 |
| 2,346,483 | Goss | Apr. 11, 1944 |
| 2,585,128 | Howe | Feb. 12, 1952 |
| 2,592,601 | Raymond | Apr. 15, 1952 |
| 2,617,742 | Olson | Nov. 11, 1952 |

OTHER REFERENCES

Overbeck: Jour. Optical Soc. of America, vol. 23, March 1933, pp. 109 to 113.